(12) United States Patent
Urbach

(10) Patent No.: US 8,584,120 B2
(45) Date of Patent: Nov. 12, 2013

(54) STREAM-BASED SOFTWARE APPLICATION DELIVERY AND LAUNCHING SYSTEM

(76) Inventor: Julian Michael Urbach, Sherman Oaks, CA (US)

( * ) Notice: Subject to any disclaimer, the term of this patent is extended or adjusted under 35 U.S.C. 154(b) by 415 days.

(21) Appl. No.: 12/624,133

(22) Filed: Nov. 23, 2009

(65) Prior Publication Data

US 2011/0126190 A1 May 26, 2011

(51) Int. Cl.
*G06F 9/445* (2006.01)

(52) U.S. Cl.
USPC .......... 717/178; 717/171; 717/173; 717/176; 717/177

(58) Field of Classification Search
None
See application file for complete search history.

(56) References Cited

U.S. PATENT DOCUMENTS

| | | | | |
|---|---|---|---|---|
| 5,734,822 | A * | 3/1998 | Houha et al. | 717/167 |
| 5,870,609 | A * | 2/1999 | Thornton et al. | 717/175 |
| 6,125,409 | A * | 9/2000 | Le Roux | 710/22 |
| 6,226,665 | B1 * | 5/2001 | Deo et al. | 718/106 |
| 6,243,789 | B1 * | 6/2001 | Hasbun et al. | 711/103 |
| 6,493,871 | B1 * | 12/2002 | McGuire et al. | 717/173 |
| 6,598,130 | B2 | 7/2003 | Harris et al. | 711/147 |
| 6,637,023 | B1 * | 10/2003 | Ginsberg | 717/122 |
| 6,986,133 | B2 * | 1/2006 | O'Brien et al. | 717/173 |
| 7,039,116 | B1 * | 5/2006 | Zhang et al. | 375/240.26 |
| 7,051,315 | B2 | 5/2006 | Artzi | |
| 7,188,186 | B1 * | 3/2007 | Meyer et al. | 709/231 |
| 7,606,924 | B2 | 10/2009 | Raz | |
| 7,673,297 | B1 * | 3/2010 | Arsenault et al. | 717/168 |
| 7,827,611 | B2 * | 11/2010 | Kouznetsov et al. | 726/24 |
| 7,886,287 | B1 * | 2/2011 | Davda | 717/168 |
| 8,055,910 | B2 * | 11/2011 | Kocher et al. | 713/193 |
| 2004/0010587 | A1 * | 1/2004 | Altamirano et al. | 709/224 |
| 2004/0230971 | A1 | 11/2004 | Rachman | |
| 2005/0005270 | A1 * | 1/2005 | Bucher et al. | 717/173 |
| 2006/0158354 | A1 * | 7/2006 | Aberg et al. | 341/50 |
| 2006/0195840 | A1 | 8/2006 | Sundarrajan | 717/176 |
| 2006/0288420 | A1 * | 12/2006 | Mantripragada et al. | 726/25 |
| 2007/0033419 | A1 * | 2/2007 | Kocher et al. | 713/193 |
| 2008/0056671 | A1 * | 3/2008 | Kamijo et al. | 386/94 |
| 2009/0007089 | A1 * | 1/2009 | Rothman et al. | 717/168 |
| 2009/0083474 | A1 * | 3/2009 | Cooke | 711/103 |
| 2009/0172637 | A1 | 7/2009 | Parikh | 717/114 |

(Continued)

FOREIGN PATENT DOCUMENTS

WO 2009/078610 6/2009

OTHER PUBLICATIONS

Search Report for WO 2011/063396, Aug. 29, 2011.

(Continued)

*Primary Examiner* — Steven Snyder
(74) *Attorney, Agent, or Firm* — James J. DeCarlo; Greenberg Traurig, LLP

(57) ABSTRACT

In one embodiment, a method includes: receiving, by a first computer system, a data stream transmitted from a second computer system over a network connection between the first computer system and the second computer system, wherein the data stream comprises executable code of a software program; extracting, by the first computer system, the executable code of the software program from the data stream; allocating, by the first computer system, an amount of dynamic memory for the executable code of the software program; loading, by the first computer system, the executable code of the software program directly into the allocated dynamic memory; and executing, by the first computer system, the software program by launching the executable code of the software program loaded in the allocated dynamic memory.

29 Claims, 3 Drawing Sheets

(56) References Cited

U.S. PATENT DOCUMENTS

| | | | |
|---|---|---|---|
| 2009/0183182 A1 | 7/2009 | Parthasarathy et al. | 719/321 |
| 2009/0217163 A1* | 8/2009 | Jaroker | 715/700 |
| 2009/0222810 A1* | 9/2009 | Walston | 717/172 |
| 2009/0271787 A1 | 10/2009 | Clark | 718/1 |
| 2010/0017795 A1* | 1/2010 | Kang et al. | 717/171 |
| 2010/0037206 A1 | 2/2010 | Larimore et al. | 717/109 |
| 2010/0259559 A1* | 10/2010 | Schneider | 345/629 |
| 2011/0047540 A1* | 2/2011 | Williams et al. | 717/178 |

OTHER PUBLICATIONS

International Search Report (PCT/US2012/026125) dated Sep. 12, 2012, 3 pages.

Supplementary European Search Report (EP 10 83 2366) dated Apr. 12, 2012; 2 pages.

* cited by examiner

STREAM-BASED SOFTWARE APPLICATION DELIVERY AND LAUNCHING SYSTEM

TECHNICAL FIELD

The present disclosure generally relates to the distribution of computer software over a computer network and more specifically relates to providing computer software over a computer network from a server to a client for execution on the client.

BACKGROUND

Computer software may be distributed to individual computer systems in various ways. For example, a piece of software may be stored on a Compact Disc (CD) or a Digital Versatile Disc (DVD). A person may put such a disc in the disc drive of a computer system to install the piece of software stored on the disc onto the computer system. More recently, computer networks provide another channel for software distribution. A person may download a piece of software from another, remote computer system (e.g., a server) over a computer network (e.g., the Internet) onto his own computer system (e.g., a client). Often, the files downloaded over the network may be an installation suite, script, or executable in which the piece of software is embedded. The person may save the downloaded file on the hard drive of his computer system, either at a permanent location or in a temporary directory, and run the saved file to install the piece of software on his computer system.

SUMMARY

The present disclosure generally relates to the distribution of computer software over a computer network and more specifically relates to providing computer software over a computer network from a server to a client for execution. In a particular implementation, the present disclosure incorporates an executable code object into a data stream that also includes data, such as multimedia data, that the executable code object, after being loaded into executable memory, consumes.

In particular embodiments, a method includes: receiving, by a first computer system, a data stream transmitted from a second computer system over a network connection between the first computer system and the second computer system, wherein the data stream comprises executable code of a software program; extracting, by the first computer system, the executable code of the software program from the data stream; allocating, by the first computer system, an amount of dynamic memory for the executable code of the software program; loading, by the first computer system, the executable code of the software program directly into the allocated dynamic memory; and executing, by the first computer system, the software program by launching the executable code of the software program loaded in the allocated dynamic memory.

These and other features, aspects, and advantages of the disclosure are described in more detail below in the detailed description and in conjunction with the following figures.

DETAILED DESCRIPTION

Figure 1:
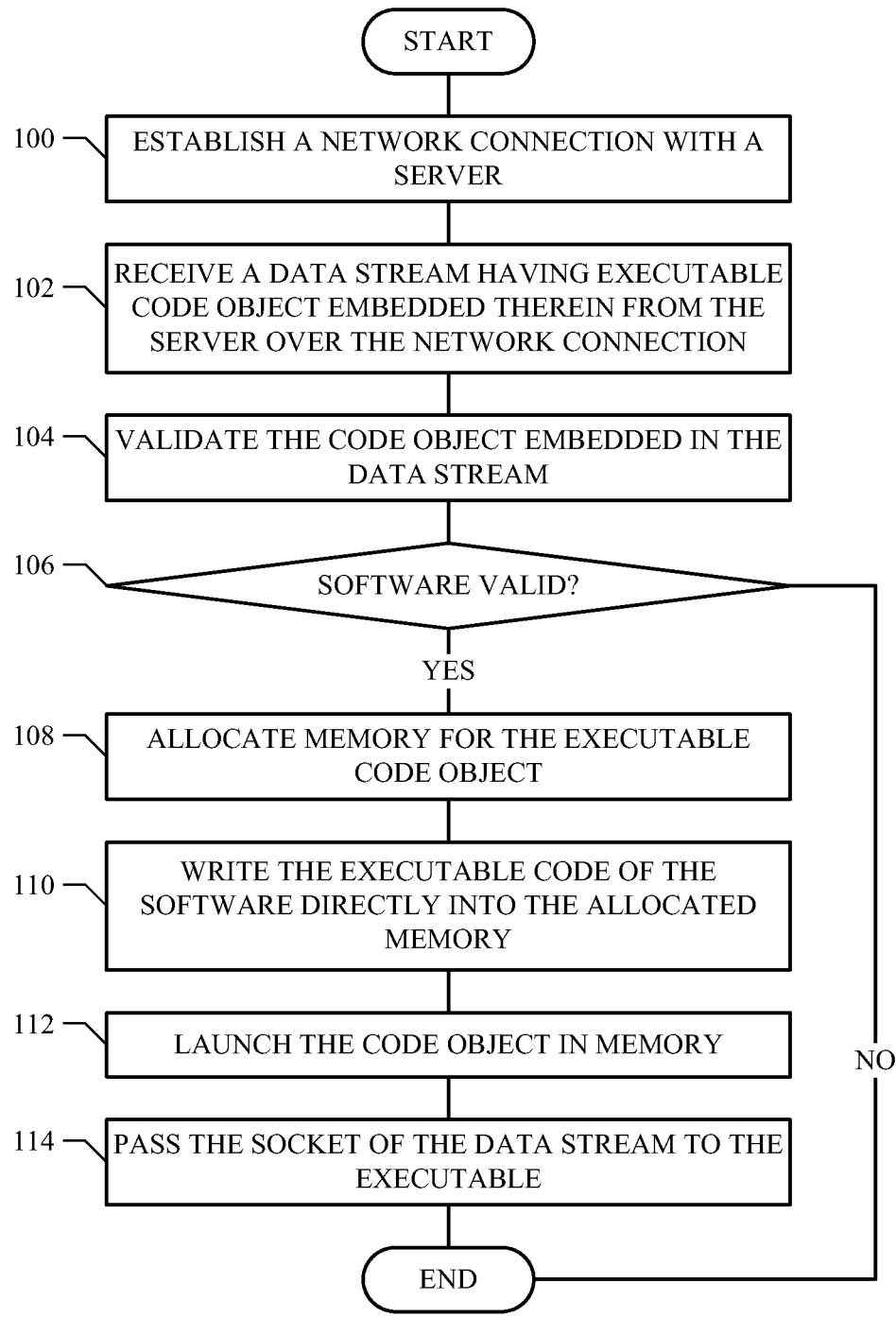
FIG. 1 illustrates an example method of providing a piece of computer software from a server to a client for execution on the client.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Computer software may be distributed from one computer system to another computer system over a computer network (e.g., the Internet). In fact, an increasing number of software developers, manufactures, and distributors consider computer networks as a convenient, fast, and cost-effective channel for software distribution. For example, a person often is able to download the latest version of a piece of computer software developed by a company from that company's website. In a typical scenario, the person may load a web page that contains the downloading link to the piece of software in a web browser executed on his computer system, and then click the downloading link provided in the web page. This usually causes a file to be downloaded to the person's computer system. The file may be an installation script or executable or the executable code of the software itself. The person may save the file on the hard drive of his computer system. If the file is an installation script or executable, the person may run the downloaded file to install the software onto his computer system. On the other hand, if the file is the executable code of the software, the person may run the software directly (e.g., by double clicking on the executable file).

Having to save or install the software programs downloaded over the computer networks onto the hard drive of a computer system in order to execute the software may be inconvenient or cumbersome at times. For example, first, saving downloaded files to a hard drive and installing software onto a computer system often take time, and if a piece of software is large in size (e.g., Adobe® PDF Reader®), the installation process may take a significant amount of time. The user of the computer system may have to go through several steps (e.g., installation, setup, etc.) before he can execute the downloaded software. Second, saving files to a hard drive and installing software onto a computer system use up storage capacity (e.g., hard drive space) of the computer system. Sometimes, a computer system (e.g., a netbook or notebook computer) may not have sufficient storage space for all of the software its user wishes to install onto the computer system. Third, software developers may update their software and release newer versions of the software from time to time. The newer versions of a piece of software usually are of a better quality than the older versions. Thus, people may wish to keep their software relatively up-to-date. However, to update a piece of software, a person often needs to uninstall the older version of the software currently installed on his computer system and then download and install the newer version.

To address some of these issues, particular embodiments enable a user of one computer system (e.g., a client) to download computer software programs from another computer system (e.g., a server) over a computer network (e.g., the Internet) for execution on the user's computer system without having to store or install the downloaded software programs onto any permanent storage (e.g., the hard drive) of the user's computer system. For purpose of clarification, hereafter, the computer system to which the software is downloaded and on which the software is executed is referred to as the "client", and the computer system from which the software is downloaded is referred to as the "server". However, one skilled in the art may appreciate that the embodiments described in more detail below may be suitably applied to any two computer systems (e.g., two servers, two clients, or a server and a client).

In particular embodiments, a software program, hereafter referred to as a "software stub" or simply a "stub", may be installed and executed on a client. In particular embodiments, the stub may establish a network connection between the client and a server and download computer software programs from the server over the network connection to the client. In particular embodiments, the executable code of a piece of software downloaded from the server to the client may be embedded in a data stream sent from the server to the client over the network connection. Upon receiving the data stream, the stub may extract the executable code of the piece of software and load it directly into the Random-Access Memory (RAM) of the client for execution on the client. The piece of software is not saved in or installed onto any permanent storage (e.g., the hard drive) of the client. Once the piece of software completes its execution on the client, the RAM space in which the executable code of the piece of software is loaded may be released and the piece of software no longer exists anywhere on the client.

In particular embodiments, the stub may be a standalone software program saved or installed on the client or a plug-in or add-on to a web browser installed on the client. The stub may be saved or installed on the client using any suitable existing methods for distributing computer software programs to individual computer systems (e.g., CD, DVD, network downloading, etc.). In particular embodiments, the stub may be a thin piece of software (i.e., small in size) so that it does not use much storage capacity of the client. The stub may be executed by itself if it is a standalone software program or via the web browser if it is plug-in or add-on software.

By using a stub to download and launch computer software programs on a client, only the stub itself needs to be permanently saved or installed on the client. The other pieces of software may be downloaded and launched on the client without having to be saved or installed on the client, which may decrease the usage of the storage capacity of the client. Furthermore, since a piece of software is downloaded just prior to its execution on a client, particular embodiments facilitate providing the latest (or any desired) version of the software each time the piece of software is downloaded and launched.

FIG. 1 illustrates an example method of downloading a computer software program from a server to a client for execution on the client for direct installation into executable memory of the client and without having to store or install the computer software persistently on the client. In particular embodiments, the steps illustrated in FIG. 1 may be performed by a stub executed on a client. In particular embodiments, the stub may be executed as a standalone application or a plug-in or add-on to a web browser on the client so that the stub may perform the steps illustrated in FIG. 1. In particular embodiments, the software program being downloaded is an application program.

Particular embodiments may establish a network connection between a client and a server, as illustrated in step 100. The network connection may be established using any suitable handshaking methods between two computer systems coupled to a computer network. For example, the stub executing on a client may send a connection request to the server, and the server, upon receiving the connection request, may send a response back, indicating whether the connection request is accepted or rejected. If the server has accepted the connection request, particular embodiments may establish the network connection between the client and the server accordingly.

In particular embodiments, each software program that may be downloaded from a server to a client by a stub executing on the client may be identified by a unique identifier. This unique identifier may be used to notify a server which piece of software a client's stub wishes to download. In particular embodiments, each piece of downloadable software may be considered a network resource. Thus, a particular piece of downloadable software may be identified by its unique network path or Uniform Resource Identifier (URI).

In particular embodiments, to establish a network connection in order to download a particular piece of software, a user of a client may provide the unique identifier (e.g., the URI) of the particular piece of software directly to a stub executing on the client, if the stub is a standalone application, or to a web browser having a stub as a plug-in. The process is very similar to requesting a web page by providing the unique Uniform Resource Locator (URL) of the web page to a web browser. For example, a user may click on a URL corresponding to a video data stream, which causes the plug-in to receive the URL and initiate a process flow described below. The stub may then determine to which particular server a network connection should be established based on the identifier of the particular piece of software the user is requesting (e.g., by mapping the URI of the piece of software being requested to an Internet Protocol (IP) address of a server). In particular embodiments, the stub may provide a user interface (UI) that allows the user to bookmark the individual identifiers of the software so that the user may retrieve the bookmarked software conveniently.

In particular embodiments, when requesting a network connection with a particular server, the stub may send the unique identifier of the particular piece of software the user is requesting to the server together with the connection request or as a part of the connection request. The server may then determine which particular piece of software it should transmit to the requesting client. Again, the process may be similar to invoking a data stream via a web browser (e.g., by clicking on a URL or URI link to a downloadable file contained in a web page).

In particular embodiments, the server may transmit a data stream to the requesting client, and more specifically, to the stub executing on the requesting client, over the network connection, as illustrated in step 102. The network connection may be a Transport Control Protocol (TCP) connection, a User Datagram Protocol (UDP) connection, or any other suitable connection. In particular embodiments, the data stream may be a video stream or an audio stream. In particular embodiments, the particular piece of software requested by the stub may be embedded in the data stream as one or more data packets. For example, the software may be a video decoder that receives a video stream encoded by a video codec, decodes the data and renders the video data on a display of the client.

In particular embodiments, the executable code of the requested piece of software may be embedded in the data stream. In particular embodiments, the executable code of the requested piece of software may be machine code or native code and may be platform-dependent. In particular embodiments, the executable code of the requested piece of software has been complied to run on the platform of the particular client requesting the software (e.g., based on the client's hardware architecture and operating system).

In particular embodiments, the data stream may includes two portions. In particular embodiments, the first portion of the data stream (i.e. the beginning of the data stream) may contain the executable code of the software. In particular embodiments, the executable code of the software may be optionally compressed using any suitable compression methods. For example, a lossless compression method, such as zip or gzip, may be used to compress the executable code of the software. In particular embodiments, the executable code of the software may be embedded within a video stream. As most types of video streams are generic container formats, data, and more specifically, the executable code of the software, may be embedded in such a video stream. In particular embodiments, the first portion of the data stream may also include operational variables and parameters, such as a parameter that indicates the size of the memory space (e.g., RAM memory space) needed to load and execute the executable code of the software.

In particular embodiments, the second portion of the data stream may optionally contain additional data that may be consumed by the software during its execution. In particular embodiments, the additional data may be optionally encoded or compressed using any suitable encoding or compressing methods and transmitted as one or more data packets. Again, if the data stream is a video stream, then the additional data may be encoded using a video encoding method, such as MPEG encoding.

In particular embodiments, upon receiving the data stream, the stub may access the first portion of the data stream to extract the executable code of the software embedded therein. If needed, the stub may decode or decompress the extracted executable code of the software. The decoding or decompressing methods used by the stub may correspond to the encoding or compressing methods used by the server transmitting the executable code of the software. For example, if the executable code of the software has been compressed using a suitable compression algorithm (e.g., a lossless compression algorithm), the stub may decompress it using a corresponding decompression algorithm. Similarly, if the executable code of the software has been encoded using a suitable encoding algorithm, the stub may decode it using a corresponding decoding algorithm. In addition, in particular embodiments, the stub may also access the first portion of the data stream to extract the parameters that indicate the size of the memory space needed to load and execute the executable code of the software.

In particular embodiments, to prevent unauthorized or malicious software from being downloaded and executed on the client, the stub may validate the executable code of the software extracted from the first portion of the data stream using any suitable validation methods, as illustrated in step 104. In particular embodiments, a white list of trusted sources (e.g., domain names or IP addresses of trusted servers) may be provided with the stub. Upon receiving a piece of software, the stub may compare the source (e.g., the server or website) transmitting the software against its white list. Only software transmitted by the trusted sources on the white list may be executed on the client. Software received from sources not on the white list may be discarded or quarantined. In particular embodiments, the executable code of the software embedded in the first portion of the data stream may be signed and associated with a digital certificate. The stub may validate the executable code of the software using its associated digital certificate.

If the executable code of the software is not valid (step 106, "NO"), then the executable code of the software is not launched on the client and may be discarded. On the other hand, if the executable code of the software is valid (step 106, "YES"), then, in particular embodiments, the stub may allocate a sufficient amount of memory on the client for loading and executing the executable code of the software, as illustrated in step 108. In particular embodiments, the amount of memory allocated may not be less than the size of the memory space needed to load and execute the executable code of the software, as indicated by the variable included in the first portion of the data stream. In particular embodiments, the allocated memory may be dynamic memory, virtual memory, or RAM of the client.

Most operating systems provide library functions that enable an application program to allocate and de-allocate dynamic memory and perform other types of memory-related functions during runtime. In particular embodiments, the stub may invoke appropriate library functions provided by the operating system of the client to allocate the required memory space for the executable code of the software. For example, "malloc( )" is a standard library function of both C and C++ programming languages for allocating dynamic memory space. For Microsoft Windows platforms, "VirtualAlloc( )" is a Win32 library function for reserving a region of pages in the virtual address space. Once the memory has been allocated, the stub may invoke appropriate library functions to set the flag for the allocated memory space as "executable", which indicates to the operating system that the data stored in the allocated memory are executable code. For example, with Microsoft Windows platforms, the flag "PAGE-EXECUTE-READWRITE" may be specified to ask the operating system for a sufficient amount of virtual memory that has the rights for reading, writing, and executing code.

In particular embodiments, the stub may load the executable code of the software directly into the allocated memory (e.g., the allocated dynamic memory) without having to save the executable code of the software on the hard drive of the client, as illustrated in step 110. In particular embodiments, the stub may invoke appropriate library functions provided by the operating system of the client to copy of the binary data representing the executable code of the software directly into the allocated dynamic memory space. For example, "memcpy( )" is a standard library function of both C and C++ programming languages for copying data from one memory location to another memory location.

In particular embodiments, the stub may also adjust a branch table (also referred to as a jump table) to include the information concerning the executable code of the software loaded in the allocated memory. This process may be referred to as a "fix-up" process. A branch table is an efficient method of transferring program control from one part to another part of a program or from one program to another program. By adjusting the appropriate branch table entries, the operating system may be made aware of the executable code of the software now loaded in the allocated memory.

The actual steps that are performed during a fix-up process may vary depending on the platform or the operating system of the computer system. For example, with Microsoft Windows platform, an executable format typically has a relocation table and an import table. In general, the executable code is linked assuming it will be loaded to a fixed address. In order to load the executable code into a different address, any absolute addresses used by the executable code are found and "fixed-up" to cater for the change in the base address. This may be achieved using the relocation table. In particular embodiments, the relocation table compiles a list of all of the absolute addresses within the executable code such that they may be fixed up when the executable code is loaded. The import table lists the absolute addresses of all of the routines that the executable code may call. This may include both API routines and routines in other dynamic-link libraries (DLLs). These import addresses are replaced with the actual addresses of the routines within the address space of the current process. The import table is a list of the location of these addresses within the executable code (the addresses may be within a jump table or trampoline area, but also may be a list of data for indirect calls).

Particular embodiments may take advantage of the Portable Executable (PE) format, which is a file format for executables, object code, and DLLs used in Microsoft Windows operating systems. The PE format is versatile in numerous environments of operating system software architecture. Generally, the PE format is a data structure that encapsulates the information necessary for the Microsoft Windows operating system loader to manage the wrapped executable code. Particular embodiments may compile and save the executable code of the software using the PE format.

In particular embodiments, the software may be executed on the client, as illustrated in step 112. In particular embodiments, the executable code of the software may be launched directed from the allocated dynamic memory in which it is stored. In particular embodiments, the stub may cause the executable code of the software loaded in the allocated memory to begin execution. Consequently, the stub may transfer the execution to the software.

In particular embodiments, the stub may pass the socket, or more precisely, the Internet socket or the network socket, associated with the network connection between the client and the server and the data stream to the software that is now being executed on the client, as illustrated in 114. Network sockets constitute a mechanism for delivering incoming data packets to the appropriate application process or thread. By passing the network socket associated with the data stream to the software, the software may now receive the additional data packets that contain the additional data in the second portion of the data stream. The software may then consume (e.g., process) the additional data contained in the second portion of the data stream. In particular embodiments, the stub may invoke appropriate library functions provided by the operating system of the client to pass the network socket to the now executing software. For example, the Windows Sockets Application Programming Interface (API), also referred to as Winsock, enables a network socket to be passed from one process to another using the "WSADuplicateSocket( )" function.

The software program may continue its execution until it is completed. In particular embodiments, once the software program has completed its execution (i.e., has exited), the dynamic memory space used to load the executable code of the software program may be de-allocated (e.g., by the operating system of the client). Subsequently, this memory space may be used for other purposes and other data may be loaded into the memory space, overriding the executable code of the software program. At this point, the software program no longer exits on the client without any state changes to client (e.g., no files on a drive, no system registry changes, etc.) because it was installed by the stub 232 directly into memory and not stored in any persistent media on the client 230 including, in some embodiments, the browser cache or other temporary data storage mechanisms.

To allow for caching of various state and application data, such as user preferences, settings, and downloaded executable code modules themselves from data streams, the stub 230 may store such data inside its own file container via a resource fork. This mechanism allows the stub 232 to be fully portable across systems. For example, a given instance of a stub (including the file container) may be attached to an email, loaded in a USB drive or the like, and thereby transferred to another system.

In some implementations, a first executable code object embedded in the stream and launched by stub 232 can itself cause another process to be generated by requesting another data stream that also includes a second executable code object. The second executable code can be launched as a child process of the first code object and share the same sand-boxed file system generated by the first executable code object. For example, the first executable code object may be a virtual machine that allows one or more second executable code objects to run entirely in memory and sand-boxed by the first virtual machine code object. In particular implementation, for example, writes to a data storage subsystem by the second code object are written by the virtual machine into memory, not a peripheral device which could be analyzed when a user logs off the client 230. For example, this embodiment can be used to allow for demonstration versions of software in that the first executable code object may be a virtual machine that sandboxes a second program to be demonstrated or tested. As discussed above, when the first and second code objects end, all traces of them in memory are gone. The foregoing embodiment can also be used to prevent unauthorized access to data that is typically cached during application execution.

Figure 2:
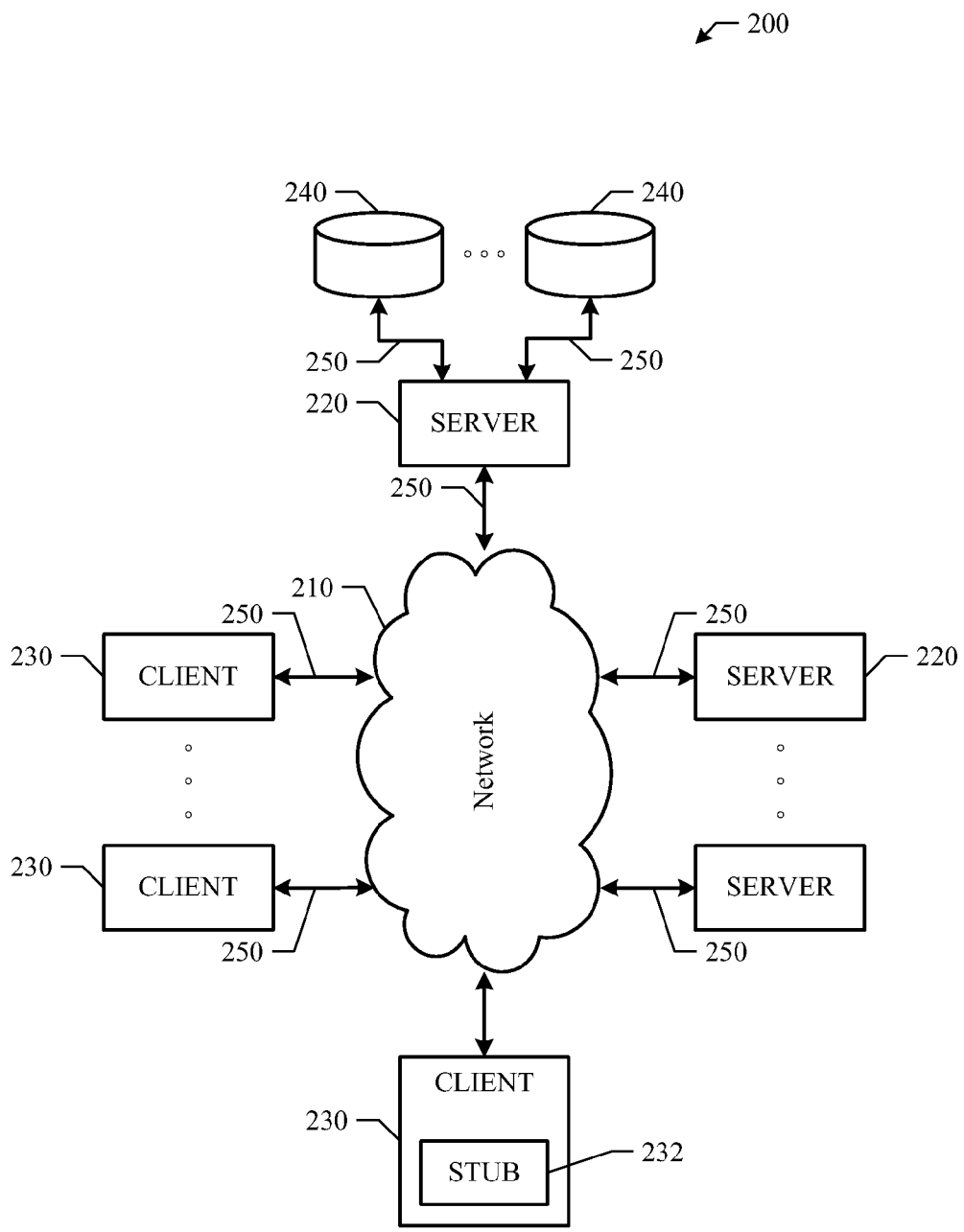
FIG. 2 illustrates an example network environment.

Particular embodiments may be implemented in a network environment. FIG. 2 illustrates an example network environment 200. Network environment 200 includes a network 210 coupling one or more servers 220 and one or more clients 230 to each other. In particular embodiments, network 210 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 210 or a combination of two or more such networks 210. The present disclosure contemplates any suitable network 210.

One or more links 250 couple servers 220 or clients 230 to network 210. In particular embodiments, one or more links 250 each includes one or more wired, wireless, or optical links 250. In particular embodiments, one or more links 250 each includes an intranet, an extranet, a VPN, a LAN, a WLAN, a WAN, a MAN, a communications network, a satellite network, a portion of the Internet, or another link 250 or a combination of two or more such links 250. The present disclosure contemplates any suitable links 250 coupling servers 220 and clients 230 to network 210.

In particular embodiments, each server 220 may be a unitary server or may be a distributed server spanning multiple computers or multiple datacenters. Servers 220 may be of various types, such as, for example and without limitation, web server, news server, mail server, message server, advertising server, file server, application server, exchange server, database server, or proxy server. In particular embodiments, each server 220 may include hardware, software, or embedded logic components or a combination of two or more such components for carrying out the appropriate functionalities implemented or supported by server 220. For example, a web server is generally capable of hosting websites containing web pages or particular elements of web pages. More specifically, a web server may host HTML files or other file types, or may dynamically create or constitute files upon a request, and communicate them to clients 230 in response to HTTP or other requests from clients 230. A mail server is generally capable of providing electronic mail services to various clients 230. A database server is generally capable of providing an interface for managing data stored in one or more data stores.

In particular embodiments, each client 230 may be an electronic device including hardware, software, or embedded logic components or a combination of two or more such components and capable of carrying out the appropriate functionalities implemented or supported by client 230. For example and without limitation, a client 230 may be a desktop computer system, a notebook computer system, a netbook computer system, a handheld electronic device, or a mobile telephone. A client 230 may enable an network user at client 230 to access network 210. A client 230 may have a web browser, such as Microsoft Internet Explorer or Mozilla Firefox, and may have one or more add-ons, plug-ins, or other extensions, such as Google Toolbar or Yahoo Toolbar. A client 230 may enable its user to communicate with other users at other clients 230. The present disclosure contemplates any suitable clients 230.

In particular embodiments, one or more data storages 240 may be communicatively linked to one or more servers 220 via one or more links 250. In particular embodiments, data storages 240 may be used to store various types of information. In particular embodiments, the information stored in data storages 240 may be organized according to specific data structures. Particular embodiments may provide interfaces that enable servers 220 or clients 230 to manage (e.g., retrieve, modify, add, or delete) the information stored in data storage 240.

In particular embodiments, a stub 232 may be installed and executed on a client 230. In particular embodiments, stub 232 may be a standalone software program or a plug-in or add-on to another software program installed and executed on client 230, such as a web browser. Stub 232, when executed on client 230, may perform the steps illustrated in FIG. 1. In particular embodiments, stub 232 may include one or more additional modules for decompressing the executable code of the software programs embedded in the data streams. In another implementation, the decompression module may itself be encoded in a data stream and launched by stub 232 to decompress one or more additional code modules embedded in the data stream.

Still further, particular embodiments allow the executable code modules embedded in the data stream to be dynamically determined based on one or more attributes of the client 230, such as device type, hardware capabilities, display mode, peripheral devices, graphics acceleration capabilities, and the like. For example, different executable code modules can be embedded in the data stream to allow different clients to consume the same media stream.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 3:
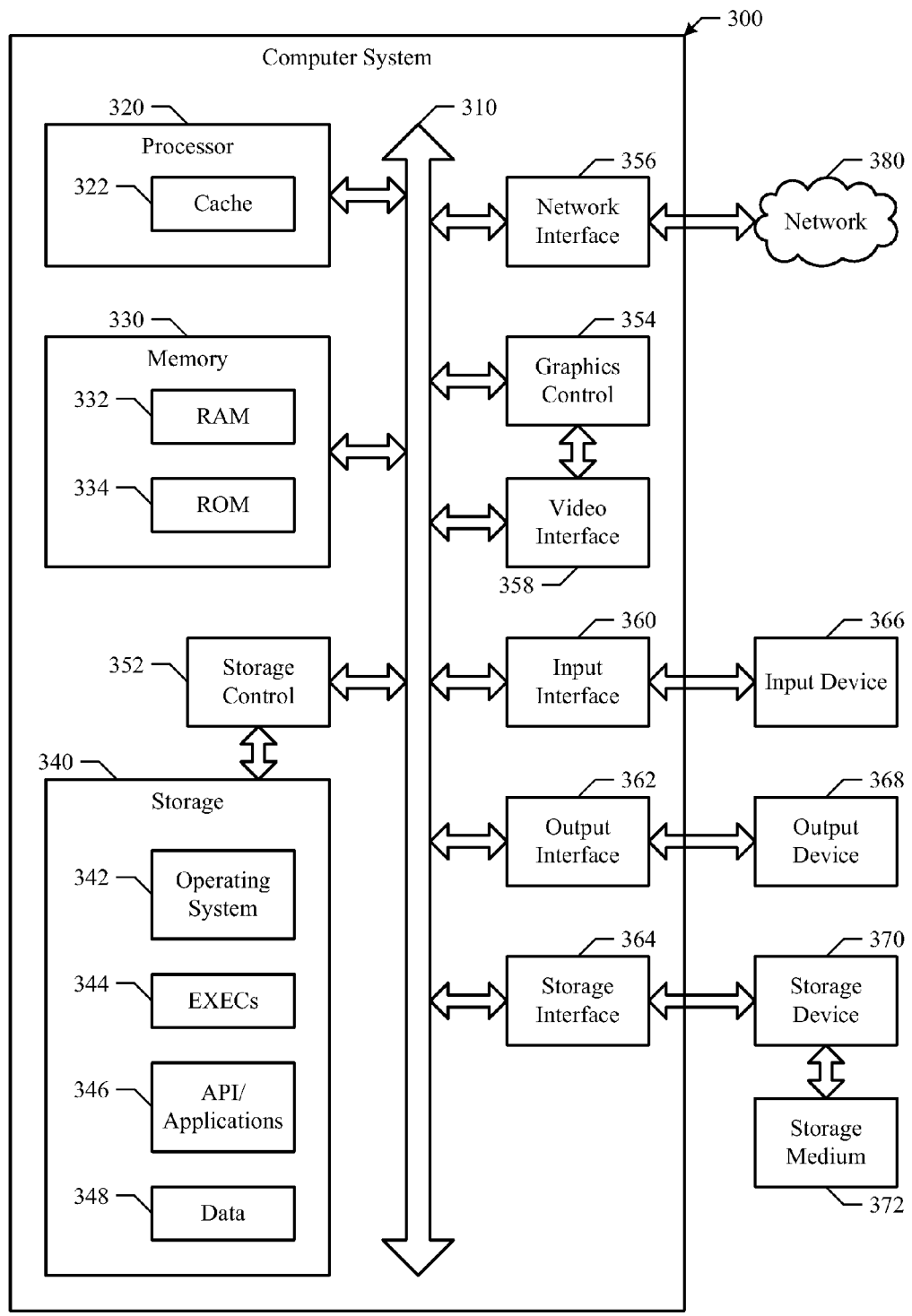
FIG. 3 illustrates an example computer system.

For example, FIG. 3 illustrates an example computer system 300 suitable for implementing one or more portions of particular embodiments. Although the present disclosure describes and illustrates a particular computer system 300 having particular components in a particular configuration, the present disclosure contemplates any suitable computer system having any suitable components in any suitable configuration. Moreover, computer system 300 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 310 couples subsystems of computer system 300 to each other. Herein, reference to a bus encompasses one or more digital signal lines serving a common function. The present disclosure contemplates any suitable system bus 310 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 300 includes one or more processors 320 (or central processing units (CPUs)). A processor 320 may contain a cache 322 for temporary local storage of instructions, data, or computer addresses. Processors 320 are coupled to one or more storage devices, including memory 330. Memory 330 may include random access memory (RAM) 332 and read-only memory (ROM) 334. Data and instructions may transfer bidirectionally between processors 320 and RAM 332. Data and instructions may transfer unidirectionally to processors 320 from ROM 334. RAM 332 and ROM 334 may include any suitable computer-readable storage media.

Computer system 300 includes fixed storage 340 coupled bi-directionally to processors 320. Fixed storage 340 may be coupled to processors 320 via storage control unit 352. Fixed storage 340 may provide additional data storage capacity and may include any suitable computer-readable storage media. Fixed storage 340 may store an operating system (OS) 342, one or more executables 344, one or more applications or programs 346, data 348, and the like. Fixed storage 340 is typically a secondary storage medium (such as a hard disk) that is slower than primary storage. In appropriate cases, the information stored by fixed storage 340 may be incorporated as virtual memory into memory 330.

Processors 320 may be coupled to a variety of interfaces, such as, for example, graphics control 354, video interface 358, input interface 360, output interface 362, and storage interface 364, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 356 may couple processors 320 to another computer system or to network 380. With network interface 356, processors 320 may receive or send information from or to network 380 in the course of performing steps of particular embodiments. Particular embodiments may execute solely on processors 320. Particular embodiments may execute on processors 320 and on one or more remote processors operating together.

In a network environment, where computer system 300 is connected to network 380, computer system 300 may communicate with other devices connected to network 380. Computer system 300 may communicate with network 380 via network interface 356. For example, computer system 300 may receive information (such as a request or a response from another device) from network 380 in the form of one or more incoming packets at network interface 356 and memory 330 may store the incoming packets for subsequent processing. Computer system 300 may send information (such as a request or a response to another device) to network 380 in the form of one or more outgoing packets from network interface 356, which memory 330 may store prior to being sent. Processors 320 may access an incoming or outgoing packet in memory 330 to process it, according to particular needs.

Computer system 300 may have one or more input devices 366 (which may include a keypad, keyboard, mouse, stylus, etc.), one or more output devices 368 (which may include one or more displays, one or more speakers, one or more printers, etc.), one or more storage devices 370, and one or more storage medium 372. An input device 366 may be external or internal to computer system 300. An output device 368 may be external or internal to computer system 300. A storage device 370 may be external or internal to computer system 300. A storage medium 372 may be external or internal to computer system 300.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 330 may include one or more computer-readable storage media embodying software and computer system 300 may provide particular functionality described or illustrated herein as a result of processors 320 executing the software. Memory 330 may store and processors 320 may execute the software. Memory 330 may read the software from the computer-readable storage media in mass storage device 330 embodying the software or from one or more other sources via network interface 356. When executing the software, processors 320 may perform one or more steps of one or more processes described or illustrated herein, which may include defining one or more data structures for storage in memory 330 and modifying one or more of the data structures as directed by one or more portions the software, according to particular needs. In addition or as an alternative, computer system 300 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising:
receiving, by a first computer system, a software stub comprising a URI (Uniform Resource Identifier) identifying a downloadable software program from a second computer system;
installing, by a first computer system, the received software stub;
transmitting, by the software stub, a request for an executable code of the downloadable software program, the request comprising the URI;
receiving, by the software stub on the first computer system, the executable code of the downloadable software program in a data stream transmitted from the second computer system over a network connection between the first computer system and the second computer system;
extracting, by the first computer system, the executable code of the downloadable software program received in the data stream from the second system;
allocating, by the first computer system, an amount of dynamic memory for the executable code of the downloadable software program;
loading, by the first computer system, the executable code of the downloadable software program extracted from the data stream directly into the allocated dynamic memory; and
executing, by the first computer system, the downloadable software program by launching the executable code of the downloadable software program loaded in the allocated dynamic memory.

2. The method recited in claim 1, wherein:
the data stream is a video stream; and
the executable code of the downloadable software program is embedded in the video stream.

3. The method recited in claim 1, wherein the executable code of the downloadable software program is machine code or native code.

4. The method recited in claim 1, wherein receiving the executable code of the software program by the first computer system further comprises:
receiving a compressed executable code of the downloadable software program by the first computer system.

5. The method recited in claim 1, further comprising:
marking, by the first computer system, the allocated dynamic memory as containing executable code; and
adjusting, by the first computer system, one or more entries of a branch table to reflect the allocated dynamic memory and the executable code of the downloadable software program loaded in the allocated dynamic memory.

6. The method recited in claim 1, wherein:
the data stream comprises a first portion and a second portion;
the first portion of the data stream comprises the executable code of the downloadable software program; and
the second portion of the data stream comprises a plurality of data to be consumed by the software program.

7. The method recited in claim 6, further comprising passing, by the first computer system, a network socket associated with the data stream to the downloadable software program so that the data contained in the second portion of the data stream are consumed by the downloadable software program during its execution.

8. The method recited in claim 1, further comprising validating, by the first computer system, the executable code of the downloadable software program.

9. The method recited in claim 1, further comprising de-allocating, by the first computer system, the allocated dynamic memory after the downloadable software program has completed its execution.

10. A first system, comprising:
a memory comprising instructions executable by one or more processors; and
one or more processors coupled to the memory, the memory storing thereon program logic for execution by the processors, the program logic comprising:
stub receiving logic, executed by the processors, for receiving a software stub comprising a URI (Uniform Resource Identifier) identifying a downloadable software program from a second computer system;
installing logic, executed by the processors, for installing the received software stub;
transmitting logic, executed by the processor, to transmit by the software stub, a request for an executable code of the software program, the request comprising the URI code;
receiving logic, executed by the processors, to receive the executable code of the software program in a data stream transmitted from the second system over a network connection between the first system and the second system;
extracting logic, executed by the processors, to extract the executable code of the software program received in the data stream from the second system;
allocating logic, executed by the processors, to allocate an amount of dynamic memory for the executable code of the software program;
loading logic, executed by the processors, to load the executable code of the software program extracted from the data stream directly into the allocated dynamic memory so that the executable code of the software program is not stored or installed on a permanent storage of the first computer system; and
logic to execute the software program by launching the executable code of the software program loaded in the allocated dynamic memory.

11. The system recited in claim 10, wherein:
the data stream is a video stream; and
the executable code of the software program is embedded in the video stream.

12. The system recited in claim 10, wherein the executable code of the software program is machine code or native code.

13. The system recited in claim 10, the program logic further comprising: decompressing logic, executed by the to decompress the executable code of the software program.

14. The system recited in claim 10 the program logic further comprising:
marking logic, executed by the processors, to mark the allocated dynamic memory as containing executable code; and
adjusting logic, executed by the processors, to adjust one or more entries of a branch table to reflect the allocated dynamic memory and the executable code of the software program loaded in the allocated dynamic memory.

15. The system recited in claim 10, wherein:
the data stream comprises a first portion and a second portion;
the first portion of the data stream comprises the executable code of the software program; and
the second portion of the data stream comprises a plurality of data to be consumed by the software program.

16. The system recited in claim 15, the program logic further comprising: passing logic, executed by the processors, to pass a network socket associated with the data stream to the software program so that the data contained in the second portion of the data stream are consumed by the software program during its execution.

17. The system recited in claim 10, the program logic further comprising:
validation logic, executed by the processors, to validate the executable code of the software program.

18. The system recited in claim 10, the program logic further comprising:
de-allocation logic, executed by the processors, to de-allocate the allocated dynamic memory after the software program has completed its execution.

19. One or more non-transitory computer-readable storage media embodying software operable when executed by a first computer system to:
receive from a second computer system, a software stub comprising a URI (Uniform Resource Identifier) identifying a downloadable software program;
install the received software stub;
transmit a request for an executable code of the software program, the request comprising the URI;
receive the executable code of the software program in a data stream transmitted from a second computer system over a network connection between the first computer system and the second computer system;
extract the executable code of the software program received in the data stream from the second system;
allocate an amount of dynamic memory for the executable code of the software program;
load the executable code of the software program extracted from the data stream directly into the allocated dynamic memory so that the executable code of the software program is not stored or installed on a permanent storage of the first computer system; and
execute the software program by launching the executable code of the software program loaded in the allocated dynamic memory.

20. The media recited in claim 19, wherein software operable for receiving the executable code of a software program further comprises software for:
receiving, by the first computer system, compressed executable code of the software program; and
decompressing, by the first computer system, the compressed executable code of the software program.

21. The media recited in claim 19, wherein the software is further operable when executed by the first computer system to:

mark the allocated dynamic memory as containing executable code; and
adjust one or more entries of a branch table to reflect the allocated dynamic memory and the executable code of the software program loaded in the allocated dynamic memory.

22. The media recited in claim 19, wherein the data stream comprises a first portion and a second portion, and
the software is further operable when executed by the first computer system to pass a network socket associated with the data stream to the software program so that the data contained in the second portion of the data stream are consumed by the software program during its execution.

23. The media recited in claim 19, wherein the software is further operable when executed by the first computer system to validate the executable code of the software program.

24. The media recited in claim 19, wherein the software is further operable when executed by the first computer system to de-allocate the allocated dynamic memory after the software program has completed its execution.

25. The method of claim 4, further comprising:
decompressing, by the first computer system, the compressed executable code of the software program.

26. The method of claim 1, further comprising:
mapping, by the software stub, the URI to an IP (Internet Protocol) address of a second computer system hosting the software program.

27. The method of claim 1, wherein the software stub is a standalone application.

28. The method of claim 1, wherein the software stub is a plugin executable by a web browser running on the first computer system.

29. A method, comprising:
configuring, by a processor associated with a server system, a software stub to comprise a URI (Uniform Resource Identifier) identifying a downloadable software program;
transmitting, by the processor, the software stub for installation to a client system;
enabling, by the processor, the client system to map the URI to an IP (Internet Protocol) address of the server system;
receiving, by the processor, a request for an executable code of the software program from the stub, the request comprises the URI;
configuring, by the processor, a data stream to comprise the executable code of the software program such that the executable code of the software program is extracted and loaded from the data stream directly into allocated dynamic memory of the client system so that the executable code of the software program is not stored or installed on a permanent storage of the client system;
transmitting, by the processor, the data stream to the client system.

* * * * *